United States Patent
Wosnitza et al.

(10) Patent No.: US 9,897,502 B2
(45) Date of Patent: Feb. 20, 2018

(54) PRESSURE TRANSDUCER

(71) Applicant: Endress + Hauser GmbH + Co. KG, Maulburg (DE)

(72) Inventors: Elmar Wosnitza, Freiburg (DE); Davide Parrotto, Weil am Rhein (DE); Lars Karweck, Binzen (DE); Ulrich Buder, Berlin (DE); Olaf Textor, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 65 days.

(21) Appl. No.: 15/022,254

(22) PCT Filed: Aug. 11, 2014

(86) PCT No.: PCT/EP2014/067180
§ 371 (c)(1),
(2) Date: Mar. 16, 2016

(87) PCT Pub. No.: WO2015/039810
PCT Pub. Date: Mar. 26, 2015

(65) Prior Publication Data
US 2016/0231187 A1 Aug. 11, 2016

(30) Foreign Application Priority Data
Sep. 19, 2013 (DE) .................. 10 2013 110 368

(51) Int. Cl.
*G01L 19/04* (2006.01)
*G01L 27/00* (2006.01)
*G01L 9/00* (2006.01)

(52) U.S. Cl.
CPC ............ *G01L 9/0052* (2013.01); *G01L 19/04* (2013.01); *G01L 27/007* (2013.01)

(58) Field of Classification Search
CPC . G01L 9/00; G01L 9/0052; G01L 9/06; G01L 9/08; G01L 19/04; G01L 27/00; G01L 27/007
See application file for complete search history.

(56) References Cited

U.S. PATENT DOCUMENTS

| 4,173,900 A | 11/1979 | Tanabe |
| 5,764,541 A | 6/1998 | Hermann |

(Continued)

FOREIGN PATENT DOCUMENTS

| CN | 201293698 Y | 8/2009 |
| CN | 102156019 A | 8/2011 |

(Continued)

OTHER PUBLICATIONS

EPCOS AG, "Pressure Sensors C27 Series", Publication, Aug. 3, 2009.
EPCOS AG, "Pressure Sensors C27 Series" Aug. 3, 2009.
German Search Report, German PTO, Munich, DE, Oct. 2, 2013.
International Search Report, EPO, The Netherlands, Nov. 3, 2014.
Eglish Translation of the International Preliminary Report on Patentability, WIPO, Geneva, CH, Mar. 31, 2016.

*Primary Examiner* — Nguyen Ha
(74) *Attorney, Agent, or Firm* — Bacon & Thomas, PLLC

(57) ABSTRACT

A pressure transducer comprising a resistive pressure sensor element with a measurement membrane which has at least four resistor elements. The resistor elements are arranged in a full-bridge circuit, having a longitudinal direction in which the full bridge circuit is to be supplied with a constant current. When being supplied with the constant current, a longitudinal voltage has a first pressure dependency and a first temperature dependency, and a diagonal voltage has a second pressure dependency and a second temperature dependency, the second pressure dependency being greater than the first pressure dependency at a given temperature. The pressure transducer has a processing circuit which is designed to determine a measured pressure value at least using the diagonal voltage and optionally the longitudinal voltage. The processing circuit is further designed to check whether a value pair of a longitudinal voltage and a diagonal voltage corresponds to an expected functional relationship at a current temperature.

4 Claims, 3 Drawing Sheets

(56) References Cited

U.S. PATENT DOCUMENTS 5,877,423 A * 3/1999 Mattsson ............... G01L 9/065
338/42
2007/0113668 A1 5/2007 McMonigal

FOREIGN PATENT DOCUMENTS

| | | | |
|---|---|---|---|
| DE | 2809549 | A1 | 10/1978 |
| DE | 102004061450 | A1 | 6/2006 |
| DE | 102011106694 | A1 | 1/2013 |
| EP | 2543979 | A2 | 9/2013 |
| GB | 2263975 | A | 8/1993 |
| WO | 9617236 | A1 | 6/1996 |
| WO | 2010003432 | A1 | 1/2010 |
| WO | 2015039810 | A1 | 3/2015 |

* cited by examiner

PRESSURE TRANSDUCER

TECHNICAL FIELD

This present invention relates to a pressure transducer with a resistive pressure sensor element, in particular a piezo-resistive pressure sensor element.

BACKGROUND AND SUMMARY OF THE INVENTION

The pressure transducer according to the invention comprises a resistive pressure sensor element having a measurement membrane, which has at least four resistor elements, wherein the resistor elements are arranged in a full-bridge circuit, wherein the full bridge has a longitudinal direction, along which power must be supplied, wherein in case of a power with a constant current, a longitudinal voltage has a first pressure dependency and a first temperature dependency, and a diagonal voltage has a second pressure dependency and a second temperature dependency, wherein the second pressure dependency at a given temperature is greater than the first pressure dependency, wherein the pressure transducer has a processing circuit, which is designed to determine a measured pressure value based on at least the diagonal voltage, wherein the processing circuit is further designed to check whether a value pair of a longitudinal voltage and of a diagonal voltage at a current temperature corresponds to an expected functional relationship.

In one further development of the invention, the processing unit is designed to, based on a result of checking whether a value pair of a longitudinal voltage and of a diagonal voltage at a current temperature corresponds to an expected functional relationship, make a statement about the quality of the measured pressure value. In one further development of the invention, the pressure transducer further has a temperature sensor for providing a temperature signal, which is a function of the temperature of the measurement membrane, wherein the temperature signal does not have a pressure dependency or has a pressure dependency that is smaller than the first pressure dependency, wherein the processing circuit is designed to determine the actual temperature of the measurement membrane based on at least the temperature signal of the temperature sensor.

In one further development of the invention, the expected functional relationship between the longitudinal voltage and the diagonal voltage at a temperature is a functional relationship, stored at a reference time, between the longitudinal voltage and the diagonal voltage at the temperature.

BRIEF DESCRIPTION OF THE DRAWINGS

The invention is explained in further detail below on the basis of an exemplary embodiment shown in the drawings. Illustrated are.

DETAILED DISCUSSION IN CONJUNCTION WITH THE DRAWINGS

Figure 1:
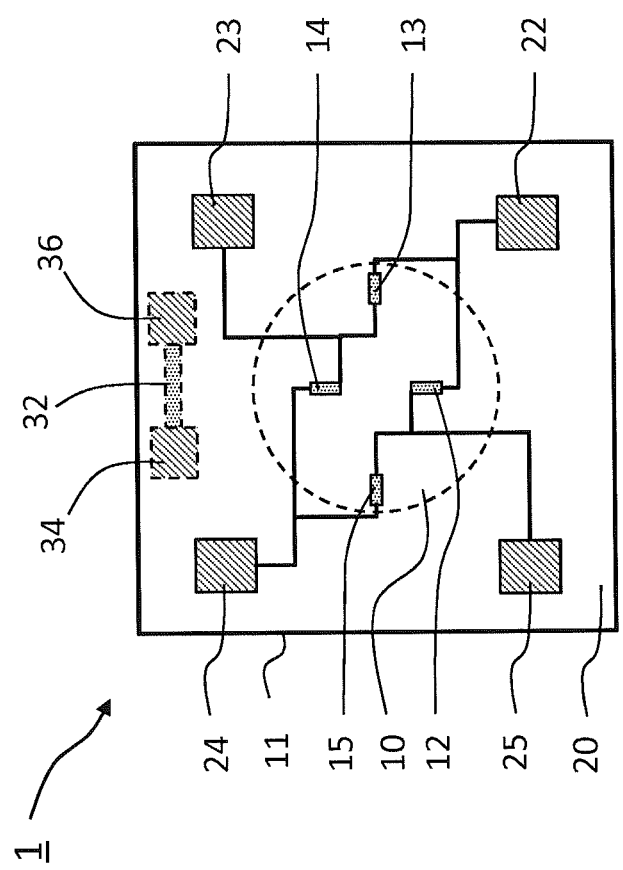
FIG. 1: a schematic representation of an exemplary embodiment of a pressure sensor element of a transducer according to the invention.

The pressure sensor element 1 illustrated in FIG. 1. comprises a measurement membrane 10, which is prepared, e.g. by etching processes in a silicon body 11. The measurement membrane 10 has four piezo-resistive resistor elements 12, 13, 14, 15, which are connected to a Wheatstone bridge, wherein in the ideal case, a first resistor element 12 and a third resistor element 14 essentially have a first pressure dependency, and a second resistor element 13 and a fourth resistor element 15 essentially have a second pressure dependency, which is different than the first pressure dependency and in particular, has a different sign. A resistor element with a different pressure dependency is arranged in the bridge circuit between the resistor elements with the same pressure dependency in each case. In an edge region 20 surrounding the measurement membrane 10, of the pressure sensor element 1, the contact surfaces 22, 23, 24, 25 are arranged, each of which contacts the bridge circuit between two resistor elements. Supply or measurement lines are connected to the contact surfaces. The bridge circuit can be supplied in measuring operation, for example, with a constant current, for which a longitudinal voltage $U_l$ must be applied between a first contact surface 22 and a third contact surface 24, which are arranged diametrically to each other. A pressure-dependent diagonal voltage can be tapped between a second contact surface 23 and a third contact surface 25, which are arranged diametrically to each other and diagonally to the first and second contact surfaces.

In the ideal case, the resistor elements in the rest position of the measurement membrane have the same resistance, so that the diagonal voltage is zero in the rest position.

If the resistor elements with different pressure dependencies had a strictly antisymmetric pressure dependency, namely $R_1(p)-R_1(p=0)=R_3(p)-R_3(p=0)=R_2(p=0)-R_2(p)=R_4(p=0)-R_4(p)$, then the longitudinal voltage $U_l$ would be independent of the pressure p. Because this is hardly feasible, the longitudinal voltage also has a pressure dependency. The longitudinal voltage and the diagonal voltage also have significant temperature dependencies, wherein the temperature dependency of the longitudinal voltage is higher than its pressure dependency. In a first approximation, the temperature dependency of the diagonal voltage can be compensated as a function of the longitudinal voltage.

Accordingly, a pressure sensor element has transfer functions for the longitudinal voltage $U_l(p,T)$ and the diagonal voltage $U_p(p,T)$ as functions of the pressure and the temperature.

The present invention now assumes that it can be checked whether a currently measured value pair $U_l(p,T)$, $U_p(p,T)$ is plausible upon knowledge of the temperature of the pressure sensor element based on the transfer functions, i.e. whether at a given temperature a longitudinal voltage $U_l(p,T)$ corresponds to an expected longitudinal voltage in case of simultaneously measured diagonal voltage $U_p(p,T)$. In order to explain this in more detail, reference is now made to FIG. 2.

Figure 2:
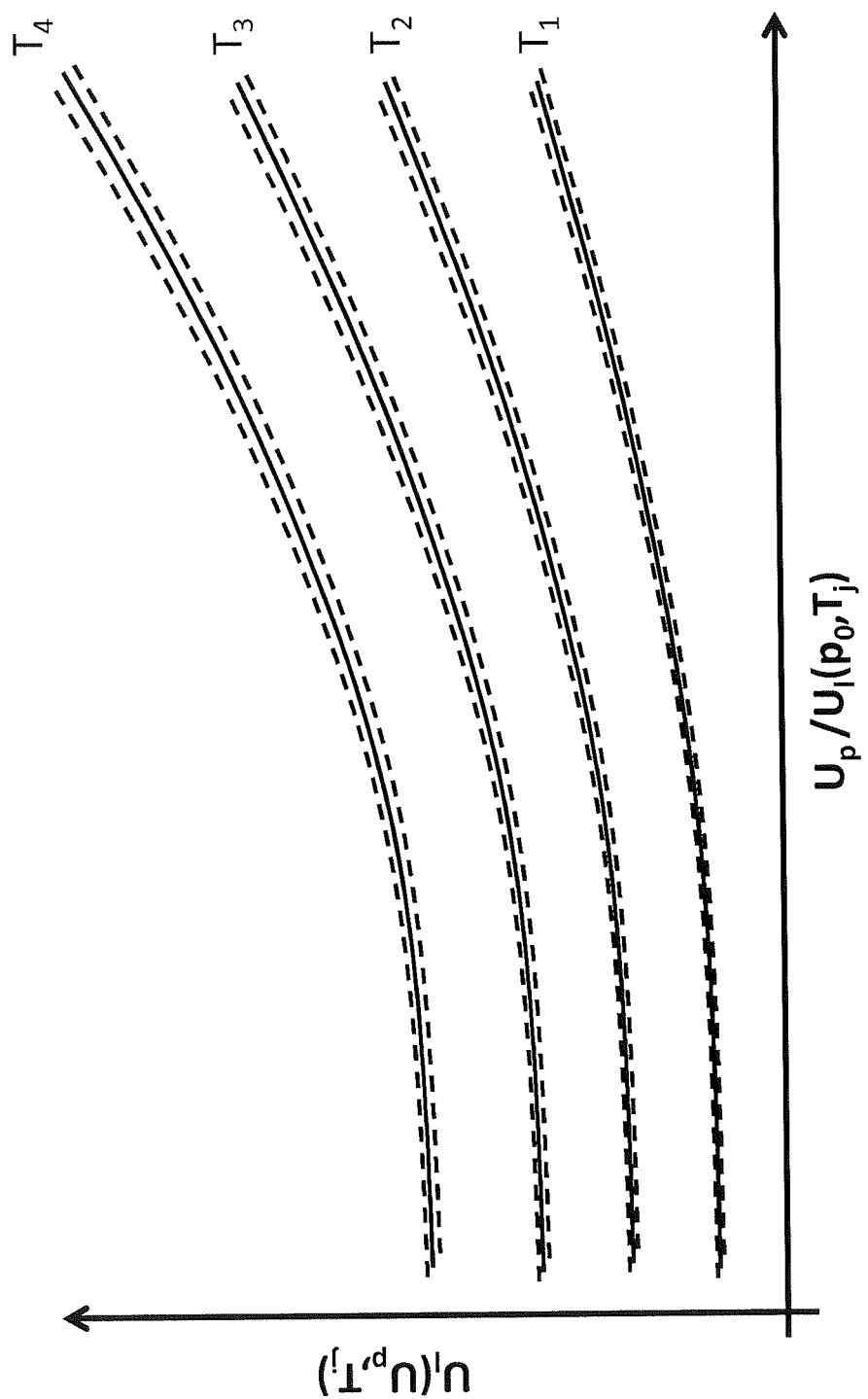
FIG. 2: a schematic representation of a functional relationship between a diagonal voltage $U_p$ and the longitudinal voltage $U_l$ wherein the temperature T is included as an independent parameter in the functional relationship.

FIG. 2 shows curves for the longitudinal voltage $U_l(U_p,T)$ of a Wheatstone bridge circuit with four piezo-resistive bridge resistors as a function of the pressure- and temperature-dependent diagonal voltage $U_p$ of the Wheatstone bridge circuit. Wherein in FIG. 2, not $U_p$ but $U_p/U_l(p_0,T_j)$ is selected as the abscissa (j=1, 2, 3, 4) for the sake of clarity. Insofar as the diagonal voltage is proportional to the longitudinal voltage in a first approximation, this standardization results in the standardized diagonal voltage $U_p/U_l(p_0,T_j)$ having approximately the same value for the same pressures at different temperatures $T_j$, so that the curves for a pressure range at different temperatures are superposed, thus allowing better illustration in a drawing. Here, the divisor $U_p/U_l(p_0,T_j)$ is an expected longitudinal voltage value at a temperature $T_j$ and an equilibrium pressure $p_0$ which is subject to $U_d(p)=0$, where $T_j$ is the measuring bridge temperature, which is preferably detected with an additional pressure-independent temperature sensor. For implementing the invention in a field device, the standardization $U_p/U_l(p_0,T_j)$ can be carried out, but this is not necessary, as it can be checked even without this standardization whether a currently measured longitudinal voltage $U_l$ corresponds to an expected value $U_l(p,T)$.

Data for $U_l(p,T)$ are recorded during the production and compensation of the pressure transducers according to the invention for each pressure transducer over the specified ranges of values of pressure and temperature at different temperatures $T_j(j=1, 2, \ldots, N)$ and stored in a data memory of the pressure transducer, for example, as a fully polynomial representation or as a table of sampling points $U_{l\,i,j}=U_l(U_{p\,i}, T_j)$ with interpolation algorithms for intermediate values of $U_l(U_p,T)$.

As shown in FIG. 2 by dashed lines, a tolerance range is defined for each function $U_l(U_p,T_j)$ which should include the actually measured values of the longitudinal voltage $U_l$ with simultaneously measured values for the diagonal voltage $U_p$ and the temperature T in the measuring operation.

If this is not the case, this is an indication that one of the transfer functions has changed, so that the quality of the measured pressure values $p(U_p,U_l)$ is no longer guaranteed. The transducer is designed to signal this.

An exact knowledge of the temperature of the pressure sensor element 1 is of course essential to the described monitoring of the pressure sensor element 1. For this purpose, the edge region 20 of the pressure sensor element 1 adjacent to the measuring membrane, as shown in FIG. 1, has a fifth resistor element 32, whose resistance value preferably depends exclusively on the temperature and in any case, has a significantly lower pressure dependency than the longitudinal resistance of the bridge circuit. The fifth resistor element is contactable via the fifth and sixth contact surfaces 34, 36.

Figure 3:
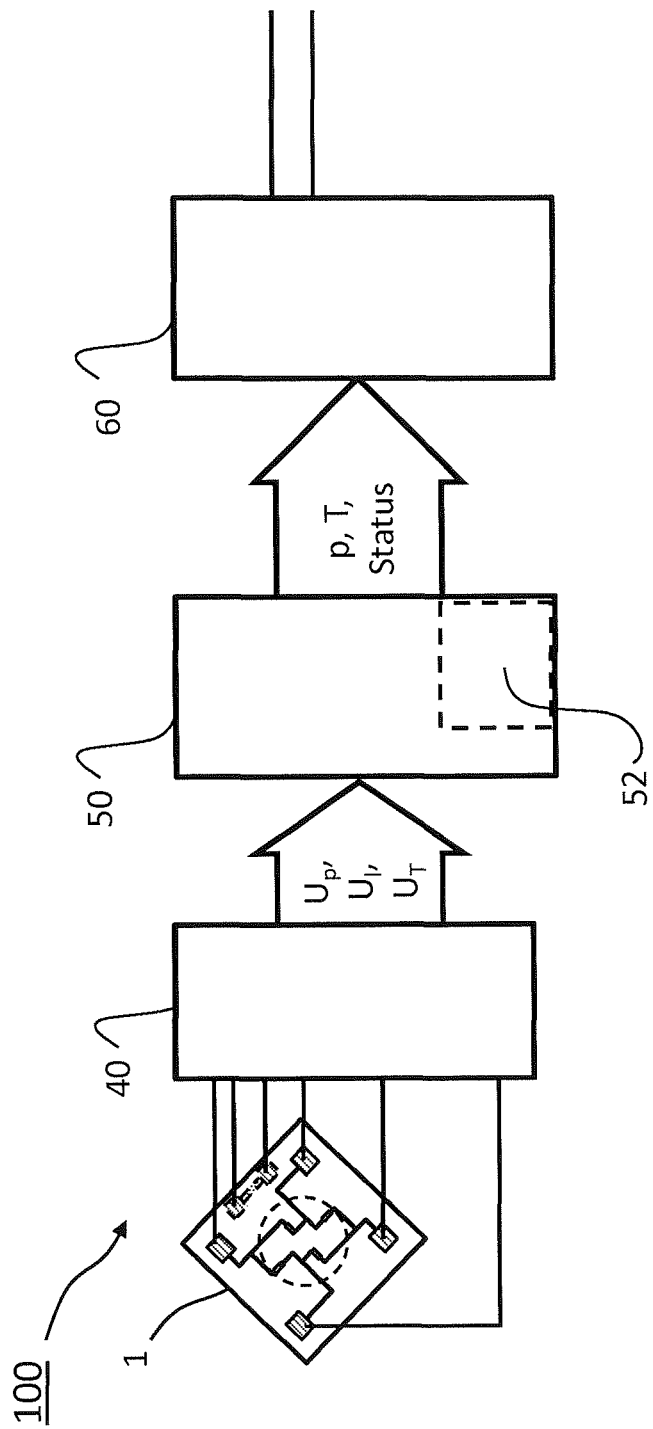
FIG. 3: a schematic representation of an exemplary embodiment of a signal path of a transducer according to the invention.

As shown in FIG. 3, the exemplary embodiment of a pressure transducer according to the invention 100 comprises a pressure sensor element 1 as it has been discussed in connection with FIG. 1.

The pressure transducer 100 also comprises an ASIC 40 which has analog outputs for supplying the bridge circuit thus essentially the pressure-independent resistor elements of the pressure sensor element 1. A constant current is supplied in each case. Furthermore, the ASIC has an analog input for recording the diagonal voltage of the bridge circuit.

The ASIC 40 also comprises a digital output, at which the three values of the diagonal voltage $U_p$, the longitudinal voltage $U_l$, and the voltage across the substantially pressure-independent resistor element $U_T$ are outputted.

The pressure transducer 100 further comprises a signal processor 50 with a data memory 52, in which compensation coefficients for determining the pressure and the temperature on the one hand and the functional dependency of the longitudinal voltage $U_l(U_p,T)$ on the diagonal voltage $U_p$ and the temperature or the functional dependency of the longitudinal voltage $U_l(U_p,U_T)$ on the diagonal voltage $U_p$ and the voltage across the substantially pressure-independent resistor element $U_T$ on the other hand are stored.

On the basis of the stored information and the three values provided by the ASIC, the signal processor determines values for the pressure p and the temperature T. It also checks whether the longitudinal voltage corresponds to a value $U_l(U_p,T)$ or $U_l(U_p,U_T)$, expected on the basis of the stored data. The signal processor outputs the three values, containing a measured pressure value, a temperature reading and status information on the measured pressure value, i.e. whether the longitudinal voltage $U_l(U_p,T)$ or $U_l(U_p,U_T)$ is as expected.

The pressure transducer 100 also comprises a main processor 60, which receives the values determined by the signal processor, and prepares them for communication to a control system.

The invention claimed is:

1. A pressure transducer, comprising:
   a resistive pressure sensor element with a measurement membrane having at least four resistor elements, wherein:
   said resistor elements are arranged in a full-bridge circuit;
   said full bridge circuit has a longitudinal direction along which power must be supplied to it;
   in case of a power supply with a constant current, a longitudinal voltage has a first pressure dependency and a first temperature dependency, and a diagonal voltage has a second pressure dependency and a second temperature dependency;
   said second pressure dependency at a given temperature is greater than said first pressure dependency;
   said pressure transducer comprises a processing circuit which is designed to determine a measured pressure value, based at least on said diagonal voltage and if necessary, said longitudinal voltage; and
   said processing circuit is further designed to check whether a value pair of a longitudinal voltage and a diagonal voltage at a current temperature corresponds to an expected functional relationship.

2. The pressure transducer according to claim 1, wherein:
   said processing unit is designed to, based on a result of checking whether a value pair of a longitudinal voltage and of a diagonal voltage at a current temperature corresponds to an expected functional relationship, make a statement about the quality of the measured pressure value.

3. The pressure transducer according to claim 1, further comprising:
   a temperature sensor for providing a temperature signal, which is a function of a temperature of said measurement membrane, wherein:
   the temperature signal does not have any pressure dependency or has a pressure dependency that is lower than said first pressure dependency;
   said processing circuit is designed to determine the actual temperature of said measurement membrane based on at least the temperature signal of said temperature sensor.

4. The pressure transducer according to claim 1, wherein:
   the expected functional relationship between said longitudinal voltage and said diagonal voltage at a temperature is a functional relationship, stored at a reference time, between said longitudinal voltage and said diagonal voltage at the temperature.

* * * * *